(12) United States Patent
Greenwood et al.

(10) Patent No.: US 8,301,671 B1
(45) Date of Patent: Oct. 30, 2012

(54) METHOD AND APPARATUS PROVIDING REMOVAL OF REPLICATED OBJECTS BASED ON GARBAGE COLLECTION

(75) Inventors: Thomas Greenwood, Newport (GB); Leigh Barry Hall, Cardiff (GB); Marco Dalco, Gwent (GB); Kevin James Wiseman, Chepstow (GB); Robert Marc Jenkins, Bristol (GB)

(73) Assignee: Avaya Inc., Basking Ridge, NJ (US)

( * ) Notice: Subject to any disclaimer, the term of this patent is extended or adjusted under 35 U.S.C. 154(b) by 672 days.

(21) Appl. No.: 12/350,739

(22) Filed: Jan. 8, 2009

(51) Int. Cl.
*G06F 7/00* (2006.01)
*G06F 17/00* (2006.01)
*G06F 17/30* (2006.01)
*G06F 13/00* (2006.01)

(52) U.S. Cl. .................... 707/813; 707/820; 711/170
(58) Field of Classification Search ...... 710/5; 719/315; 717/127
See application file for complete search history.

(56) References Cited

U.S. PATENT DOCUMENTS

| 6,249,792 | B1 * | 6/2001 | Zwilling et al. | 1/1 |
| 6,421,690 | B1 * | 7/2002 | Kirk, III | 1/1 |
| 6,745,310 | B2 * | 6/2004 | Chow et al. | 711/170 |
| 6,985,912 | B2 * | 1/2006 | Mullins et al. | 1/1 |
| 7,272,666 | B2 * | 9/2007 | Rowan et al. | 710/5 |
| 7,761,487 | B2 * | 7/2010 | Bansal et al. | 707/813 |
| 2007/0011660 | A1 * | 1/2007 | Garyali et al. | 717/127 |
| 2008/0127211 | A1 * | 5/2008 | Belsey et al. | 719/315 |

* cited by examiner

*Primary Examiner* — Susan Chen
(74) *Attorney, Agent, or Firm* — Anderson Gorecki & Rouille LLP (57) ABSTRACT

A method, apparatus and computer program product for providing removal of replicated objects based on garbage collection is presented. Data objects are replicated from a primary source to a backup device. A notification is received from a garbage collection process for at least one data object replicated from the primary source to the backup device, the notification indicating that the data object should be deleted. The data object having the notification is deleted from the backup destination.

21 Claims, 11 Drawing Sheets

*Figure 11*

METHOD AND APPARATUS PROVIDING REMOVAL OF REPLICATED OBJECTS BASED ON GARBAGE COLLECTION

BACKGROUND

A typical computer system runs many processes. One process run by certain computer systems is known as Garbage Collection (GC). Garbage Collection is the process of automatically freeing objects that are no longer referenced by the program. This frees the programmer from having to keep track of when to free allocated memory, thereby preventing many potential bugs and headaches. When an object is no longer referenced by a program, the heap space it occupies is recycled so that the space is available for subsequent new objects. The Garbage Collector must determine which objects are no longer referenced by the program and make available the heap space occupied by such unreferenced objects. In the process of freeing unreferenced objects, the Garbage Collector must run any finalizers of objects being freed. In addition to freeing unreferenced objects, a Garbage Collector may also combat heap fragmentation. Heap fragmentation occurs through the course of normal program execution. New objects are allocated, and unreferenced objects are freed such that free blocks of heap memory are left in between blocks occupied by live objects. Requests to allocate new objects may have to be fulfilled by extending the size of the heap even though there is enough total unused space in the existing heap. This will happen if there is not enough contiguous free heap space available into which the new object will fit. On a virtual memory system, the extra paging required to service an ever-growing heap could degrade the performance of the executing program.

A Garbage Collector performs several tasks. First, the GC must detect garbage objects. Second, the GC must reclaim the heap space used by the garbage objects and make this space available to the program. Garbage detection is ordinarily accomplished by defining a set of roots and determining reachability from the roots. An object is reachable if there is some path of references from the roots by which the executing program can access the object. The roots are accessible to the program. Any objects that are reachable from the roots are considered live. Objects that are not reachable are considered garbage, because they can no longer affect the future course of program execution.

When the Garbage Collector starts running it assumes that all the objects in the heap are garbage. The Garbage Collector starts walking the roots and building a graph of all objects reachable from the roots. Once all the roots have been checked, the Garbage Collector's graph contains the set of all objects that are somehow reachable from the application's roots. Any objects that are not in the graph are not accessible by the application, and are therefore considered garbage. The Garbage Collector walks through the heap linearly, looking for contiguous blocks of garbage objects. The Garbage Collector then copies the non-garbage objects down in memory removing all of the gaps in the heap. Moving the objects in memory invalidates all pointers to the objects. Therefore the Garbage Collector modifies the application's roots so that the pointers point to the objects' new locations. In addition, if any object contains a pointer to another object, the Garbage Collector is responsible for correcting these intra-heap pointers as well. Finally the pointer is positioned just after the last non-garbage object.

Another process that may be run by computer systems is reference counting. Reference counting is a technique of storing the number of references, pointers, or handles to a resource such as an object or block of memory. It is typically used as a means of deallocating objects which are no longer referenced. Reference counting is often known as a garbage collection algorithm where each object contains a count of the number of references to it held by other objects. If an object's reference count reaches zero, the object has become inaccessible, and it is put on a list of objects to be destroyed.

Simple reference counts require frequent updates. Whenever a reference is destroyed or overwritten, the reference count of the object it references is decremented, and whenever one is created or copied, the reference count of the object it references is incremented.

One of the advantages of reference counting is that objects are reclaimed as soon as they can no longer be referenced, and in an incremental fashion, without long pauses for collection cycles and with clearly defined lifetime of every object. In real-time applications or systems with limited memory, this is important to maintain responsiveness. Reference counting is also among the simplest forms of garbage collection to implement. It also allows for effective management of non-memory resources such as operating system objects, which are often much scarcer than memory.

In information technology, the term "backup" refers to making copies of data so that these additional copies may be used to restore the original data after a data loss event. These additional copies are typically called "backups." Backups are useful primarily for two purposes. The first is to restore a state following a disaster (called disaster recovery). The second is to restore small numbers of files after they have been accidentally deleted or corrupted.

Since a backup system contains at least one copy of all data worth saving, the data storage requirements are considerable. Organizing this storage space and managing the backup process is a complicated undertaking. A data repository model can be used to provide structure to the storage. In the modern era of computing there are many different types of data storage devices that are useful for making backups. There are also many different ways in which these devices can be arranged to provide redundancy, data security, and portability.

SUMMARY

The reference counting mechanism described above suffer from a variety of deficiencies. One such deficiency is that reference counting has two main disadvantages over garbage collection, both of which require additional mechanisms to ameliorate. The frequent updates reference counting involves are a source of inefficiency. While garbage collectors can impact efficiency severely via context switching and cache line faults, they collect relatively infrequently, while accessing objects is done continually. Also, reference counting requires every memory-managed object to reserve space for a reference count. In garbage collectors, this information is stored implicitly in the references that refer to that object, saving space, although garbage collectors, particularly incremental ones, can require additional space for other purposes.

Embodiments of the invention significantly overcome such deficiencies in reference counting with respect to the removal of replicated objects, and provide mechanisms and techniques that provide removal of replicated objects based on garbage collection. In a particular embodiment of a method for providing removal of replicated objects based on garbage collection, the method includes replicating data objects from a primary source to a backup device. The method further includes receiving a notification from a garbage collection process for at least one data object replicated from the primary source to the backup device, the notification indicating that the data object should be deleted. Additionally, the method includes deleting from the backup destination data objects for which the primary source has received a garbage collection notification.

Other embodiments include a computer readable medium having computer readable code thereon for providing removal of replicated objects based on garbage collection. The computer readable medium includes instructions for replicating data objects from a primary source to a backup device. The computer readable medium further includes instructions for receiving a notification from a garbage collection process for at least one data object replicated from the primary source to the backup device, the notification indicating that the data object should be deleted. Additionally, the computer readable medium includes instructions for deleting from the backup destination data objects for which the primary source has received a garbage collection notification.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides removal of replicated objects based on garbage collection as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing removal of replicated objects based on garbage collection as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views.

The drawings are not necessarily to scale, emphasis instead being placed upon illustrating the principles of the invention.

DETAILED DESCRIPTION

Many different techniques have been developed to optimize the backup procedure. These include optimizations for dealing with open files and live data sources as well as compression, encryption, and de-duplication, among others. Many organizations and individuals try to have confidence that the process is working as expected and work to define measurements and validation techniques. It is also important to recognize the limitations and human factors involved in any backup scheme.

One method of providing backups utilizes reference counts to determine when to remove a replicated object. Incrementing and decrementing reference counts every time a reference is created or destroyed can significantly impede performance. Not only do the operations take time, but they can damage cache performance and can lead to pipeline bubbles. Even read-only operations like calculating the length of a list may require a large number of reads and writes for reference updates.

Due to the multi-threaded nature of some applications, replication of object state and object references sent from the primary server to the backup server may be sent out-of-order. It is possible, for example, for there to be no references to a replicated object on the backup simply because those references have not yet been replicated. As a result, only the primary server knows when a replicated object can be safely deleted, and the primary must send deletion notifications to the backup to prevent stale data on the backup. Without these notifications, the primary might have to re-send data to the backup as the backup would be forced to delete data when it was not referenced."

In certain garbage collected systems, it is possible to receive notifications from the garbage collector, including notifications when an object is in the process of being garbage collected. For example, Java provides such facilities in it's java.lang.ref package. This package provides reference-object classes, which support a limited degree of interaction with the garbage collector. A program may use a reference object to maintain a reference to some other object in such a way that the latter object may still be reclaimed by the garbage collector. A program may also arrange to be notified some time after the collector has determined that the reachability of a given object has changed. A program requests to be notified of changes in an object's reachability by registering a reference-object with a reference queue. Some time after the garbage collector determines that the reachability of the referent has changed to the value corresponding to the type of the reference, it will add the reference to the associated queue. The program may poll the queue for references that have become enqueued.

Java defines different levels of reachability for objects. Going from strongest to weakest, the different levels of reachability reflect the life cycle of an object. They are operationally defined as follows: An object is strongly reachable if it can be reached by some thread without traversing any reference objects. A newly-created object is strongly reachable by the thread that created it. An object is softly reachable if it is not strongly reachable but can be reached by traversing a soft reference. An object is weakly reachable if it is neither strongly nor softly reachable but can be reached by traversing a weak reference. When the weak references to a weakly-reachable object are cleared, the object becomes eligible for finalization. An object is phantom reachable if it is neither strongly, softly, nor weakly reachable, it has been finalized, and some phantom reference refers to it. Finally, an object is unreachable, and therefore eligible for reclamation, when it is not reachable in any of the above ways.

Figure 1:
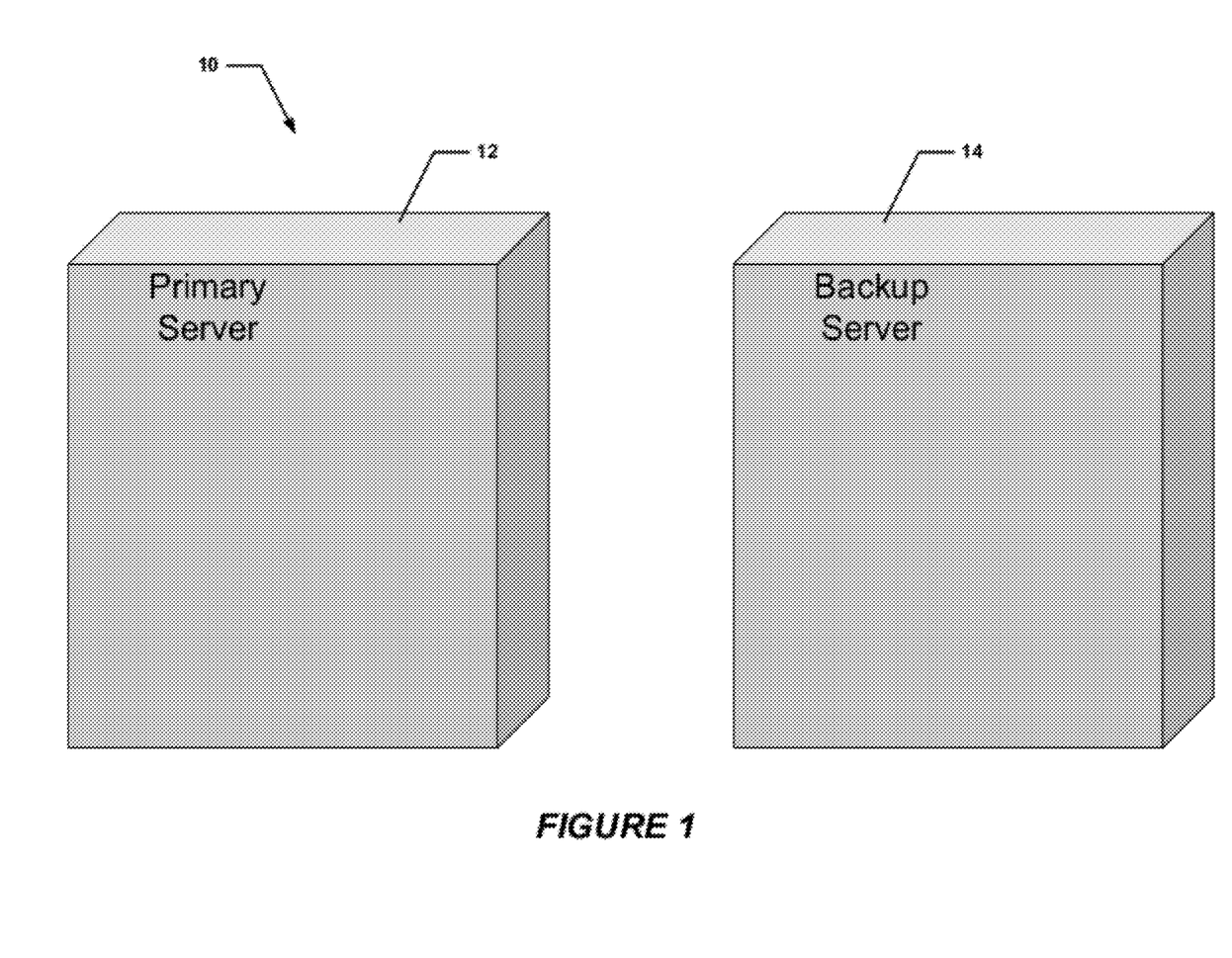
FIG. 1 depicts a block diagram of a backup environment.

Referring now to FIGS. 1-9, block diagrams of a system performing a particular embodiment of the presently disclosed method and apparatus that performs removal of replicated objects based on garbage collection is shown. Referring now to FIG. 1, a backup environment 10 is shown. Environment 10 includes a primary source (primary server 12) in communication with a backup device (backup server 14). Backup device 14 may be used to restore a state following a disaster (called disaster recovery). Backup device 14 may also be used to restore small numbers of files after they have been accidentally deleted or corrupted.

Figure 2:
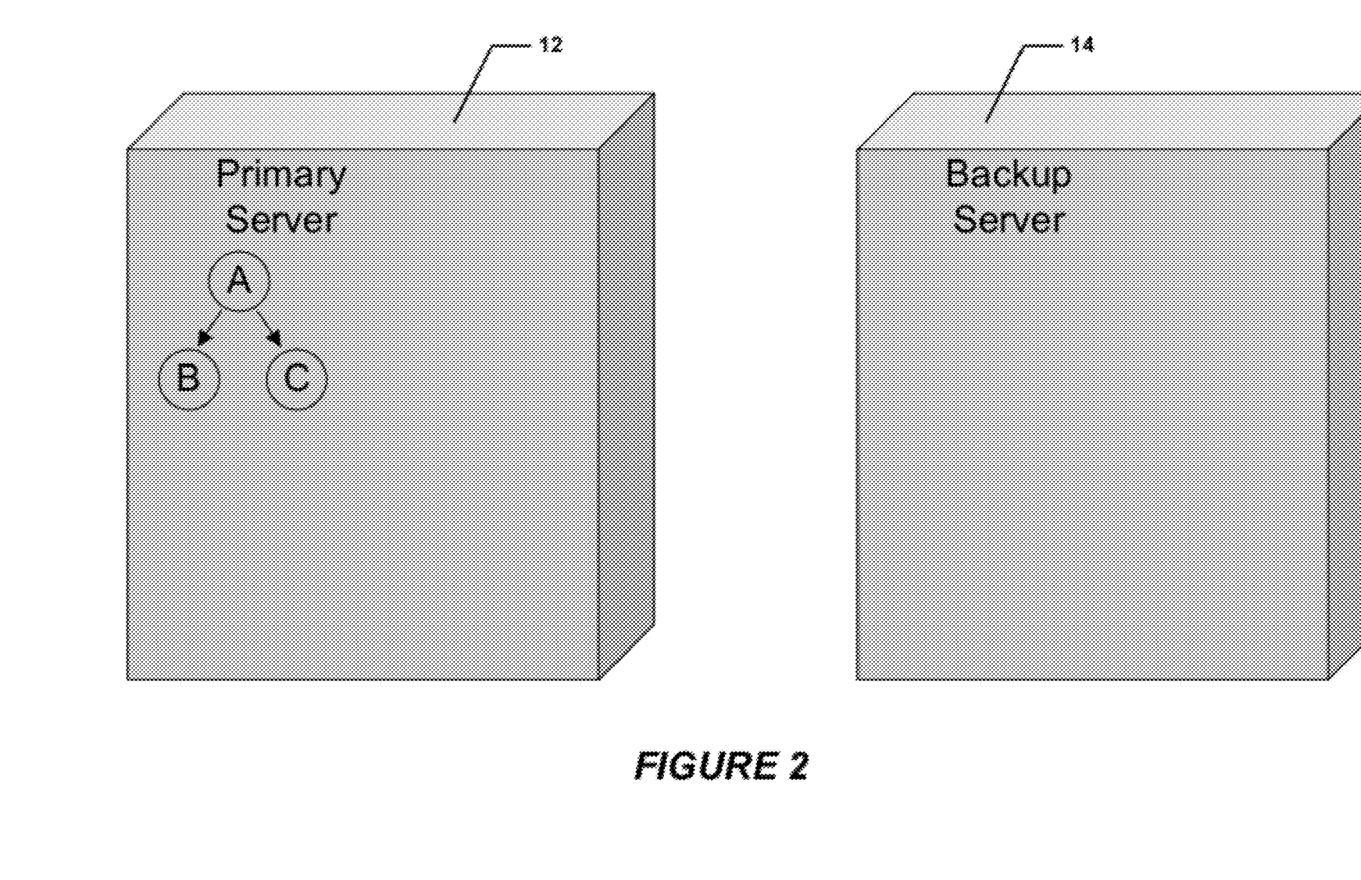
FIG. 2 depicts a block diagram of a backup environment wherein data objects are shown on a primary server.

Referring now to FIG. 2, a first thread running on primary server 12 has created data objects A, B and C. Data object A has a strong reference to data object B, and data object A also has a strong reference to data object C.

Figure 3:
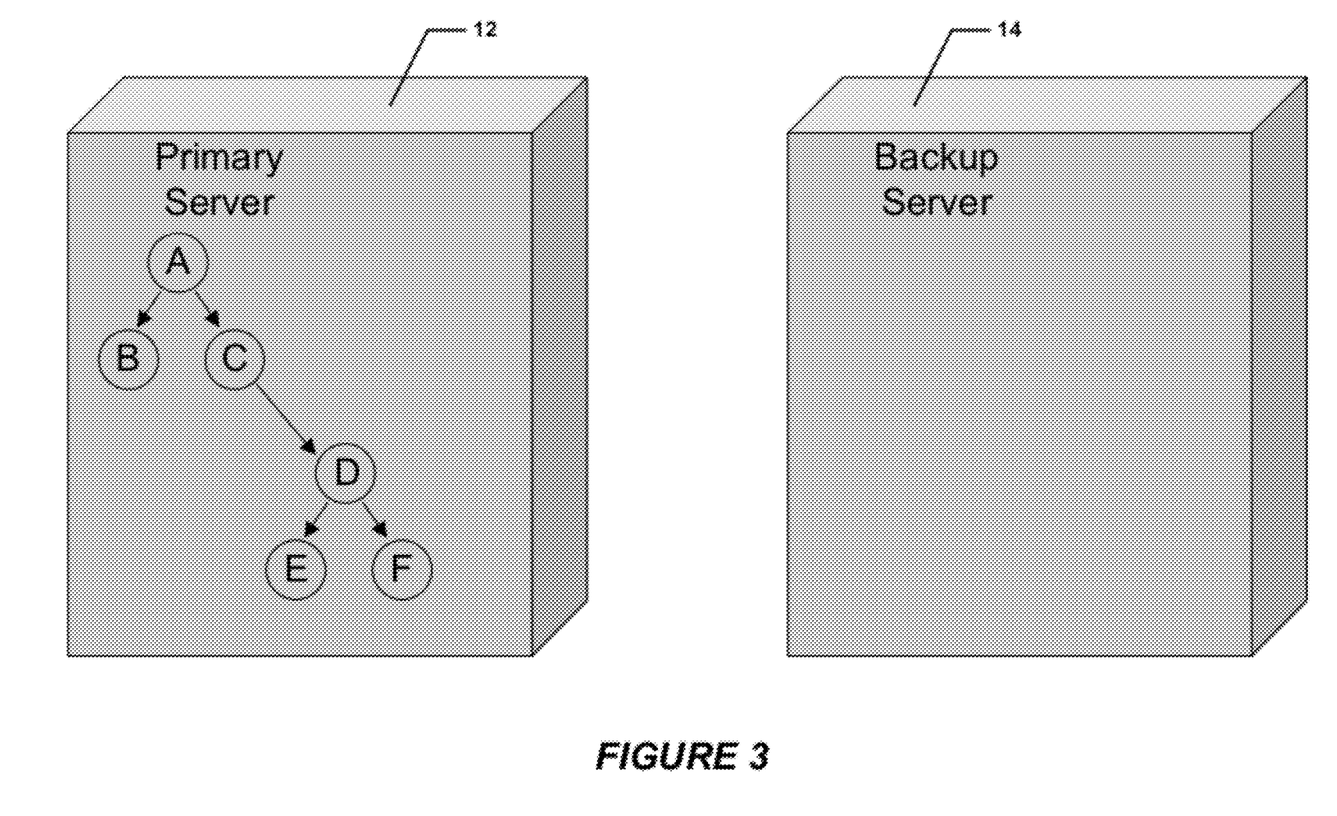
FIG. 3 depicts a block diagram of a backup environment wherein additional data objects are shown.

FIG. 3 shows that another thread has created data objects D, E and F. Data object C has a strong reference to data object D. Data object D has a strong reference to data object E, and data object D also has a strong reference to data object F.

Figure 4:
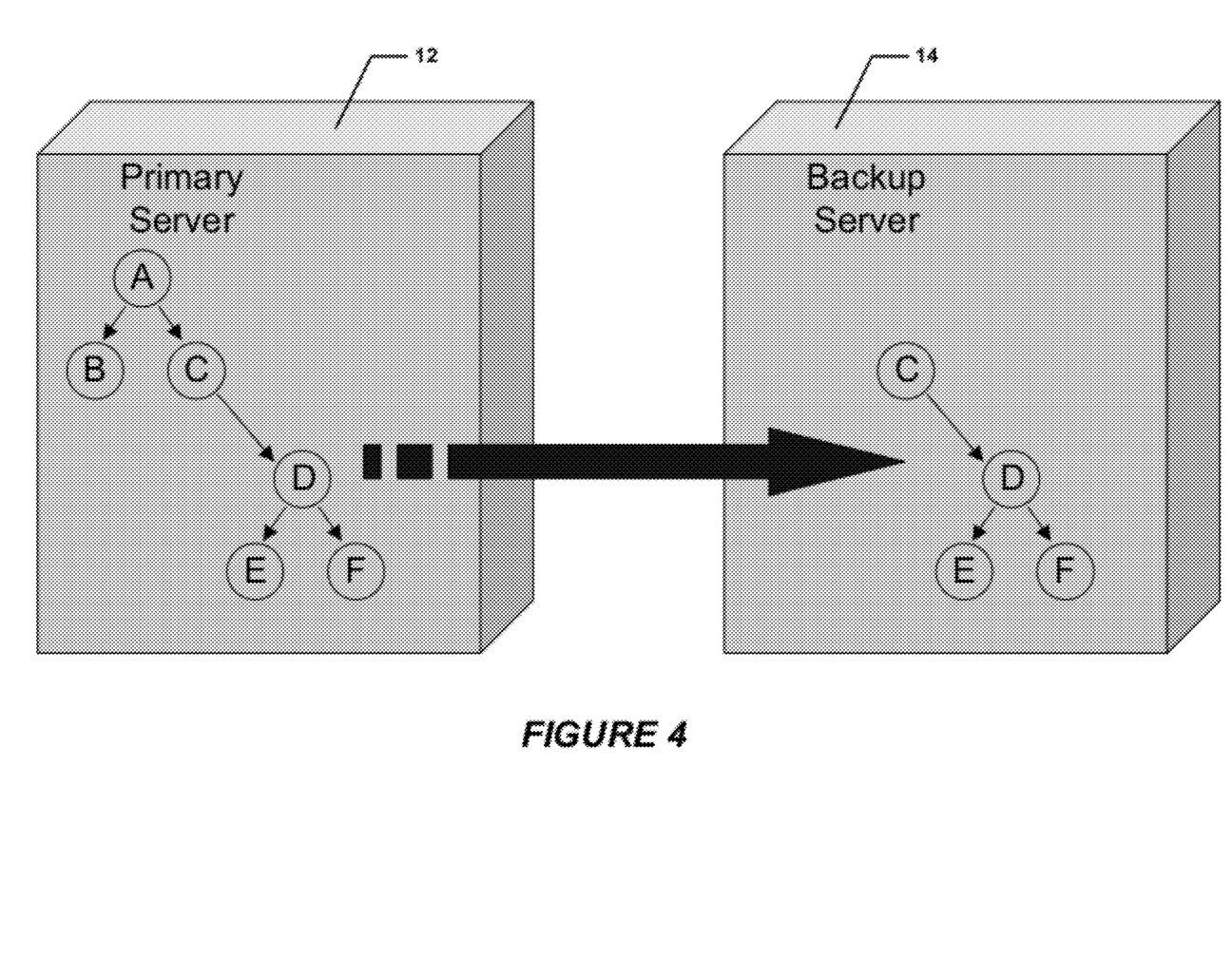
FIG. 4 depicts a block diagram of a backup environment wherein certain data objects have been replicated to a backup server.

FIG. 4 shows a replication action taking place, wherein data objects C, D, E and F are replicated on backup server 14. On backup server 14 data object C has a strong reference to data object D, data object D has a strong reference to data object E, and data object D also has a strong reference to data object F. Data object C is not referenced on backup server 14, because data object A has not yet been replicated. Backup server 14 cannot delete data object C because, from the point of view of backup server 14, data object C may be referenced by data that is yet to be replicated. Backup server 14 relies on primary server 12 to notify it when objects are no longer referenced.

Figure 5:
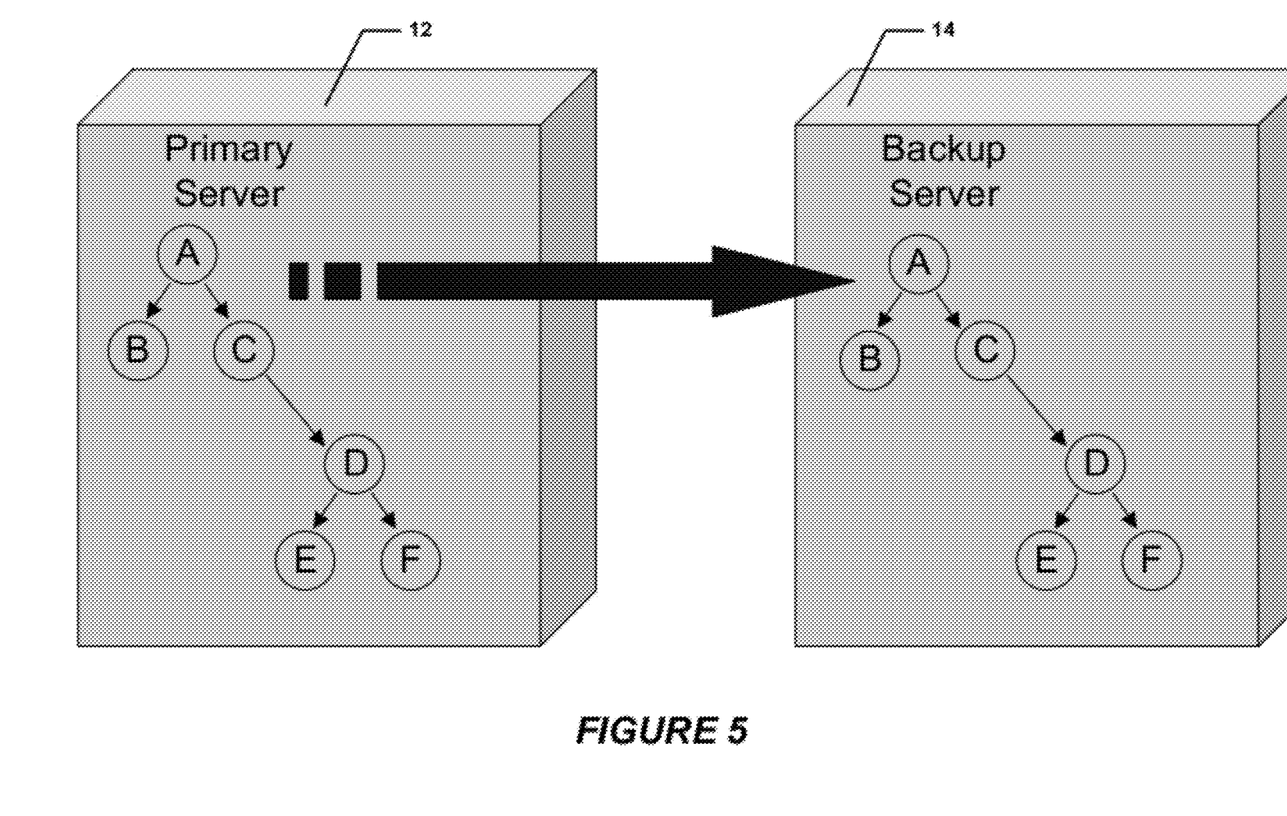
FIG. 5 depicts a block diagram of a backup environment wherein additional data objects have been replicated in the backup server.

Referring now to FIG. 5, another replication action is taking place. Node A, B and C have been replicated to backup server 14. On backup server 14 data object A has a strong reference to data object B, data object A has a strong reference to data object C, data object C also has a strong reference to data object D, data object D also has a strong reference to data object E and data object D has a strong reference to data object F. At this point backup server 14 is fully synchronized with primary server 12.

Figure 6:
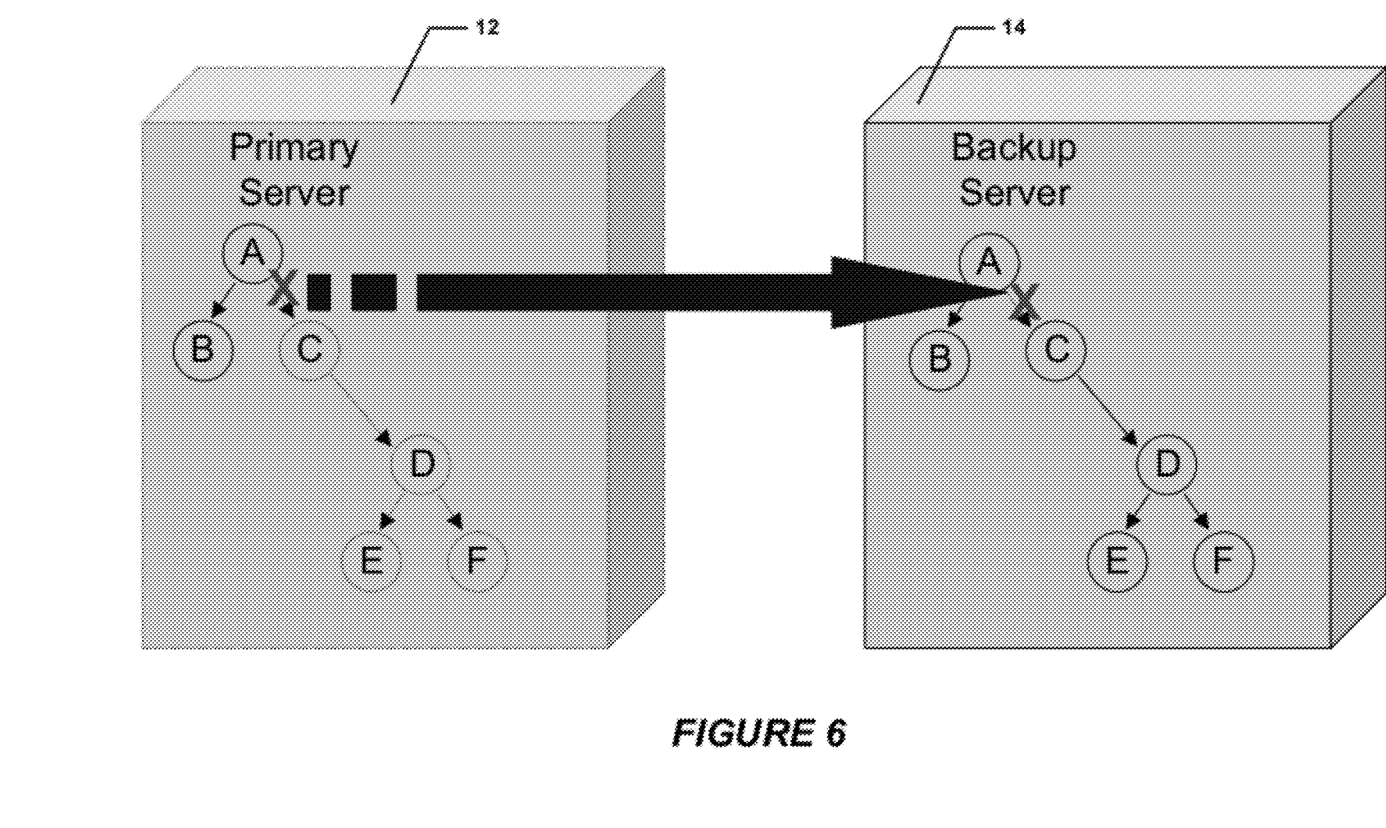
FIG. 6 depicts a block diagram of a backup environment wherein weakly referenced nodes are shown on the primary server and replicated on the backup server.

In FIG. 6, on primary server 12, a new thread has removed data object C from data object A. This action is also replicated on backup server 14, but data objects C, D, E and F remain on backup server 14 for the time being.

Figure 7:
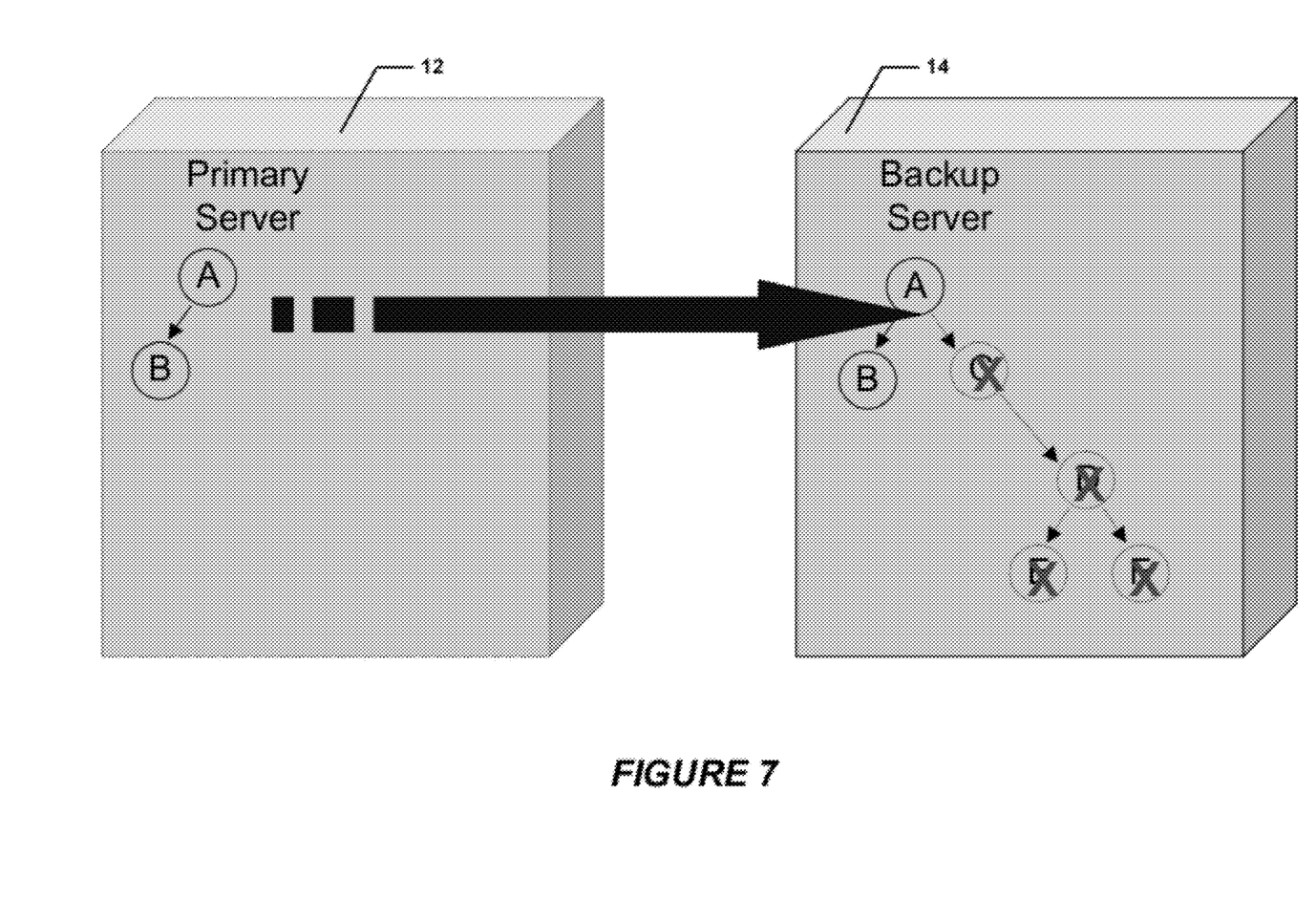
FIG. 7 depicts a block diagram of a backup environment wherein the prior weakly referenced nodes are removed from the primary server and the backup server is notified.

FIG. 7 shows that the garbage collection process running on primary server 12 sends a weak reference notification that data objects C, D, E and F are now garbage. As a result, a delete notification regarding data objects C, D, E and F is sent to backup server 14.

Figure 8:
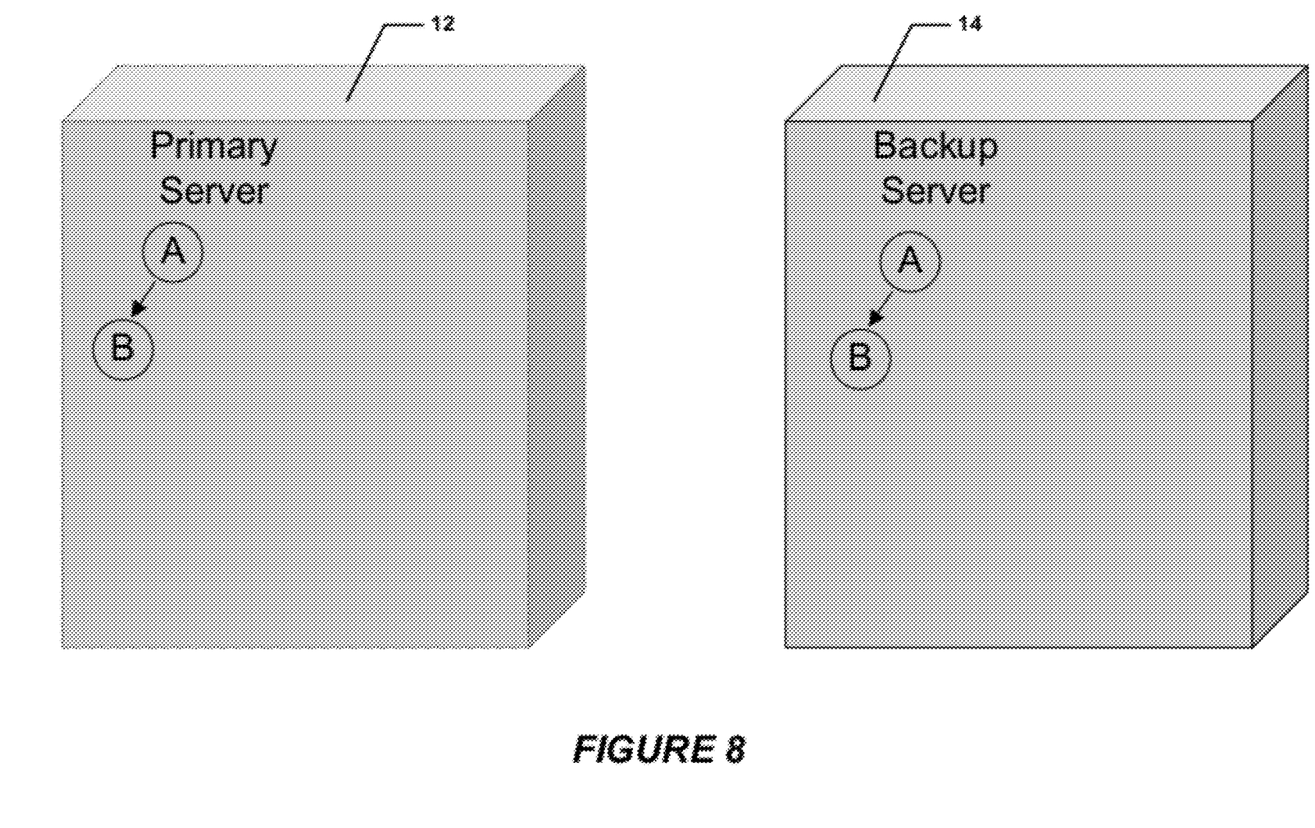
FIG. 8 depicts a block diagram of a backup environment wherein the weakly referenced nodes are removed from the backup server.

FIG. 8 shows that data objects C, D, E and F have been deleted from backup server 14. As a result, backup server 14 is synchronized with primary server 12. Each of primary server 12 and backup sever 14 now have data object A referencing data object B.

Figure 9:
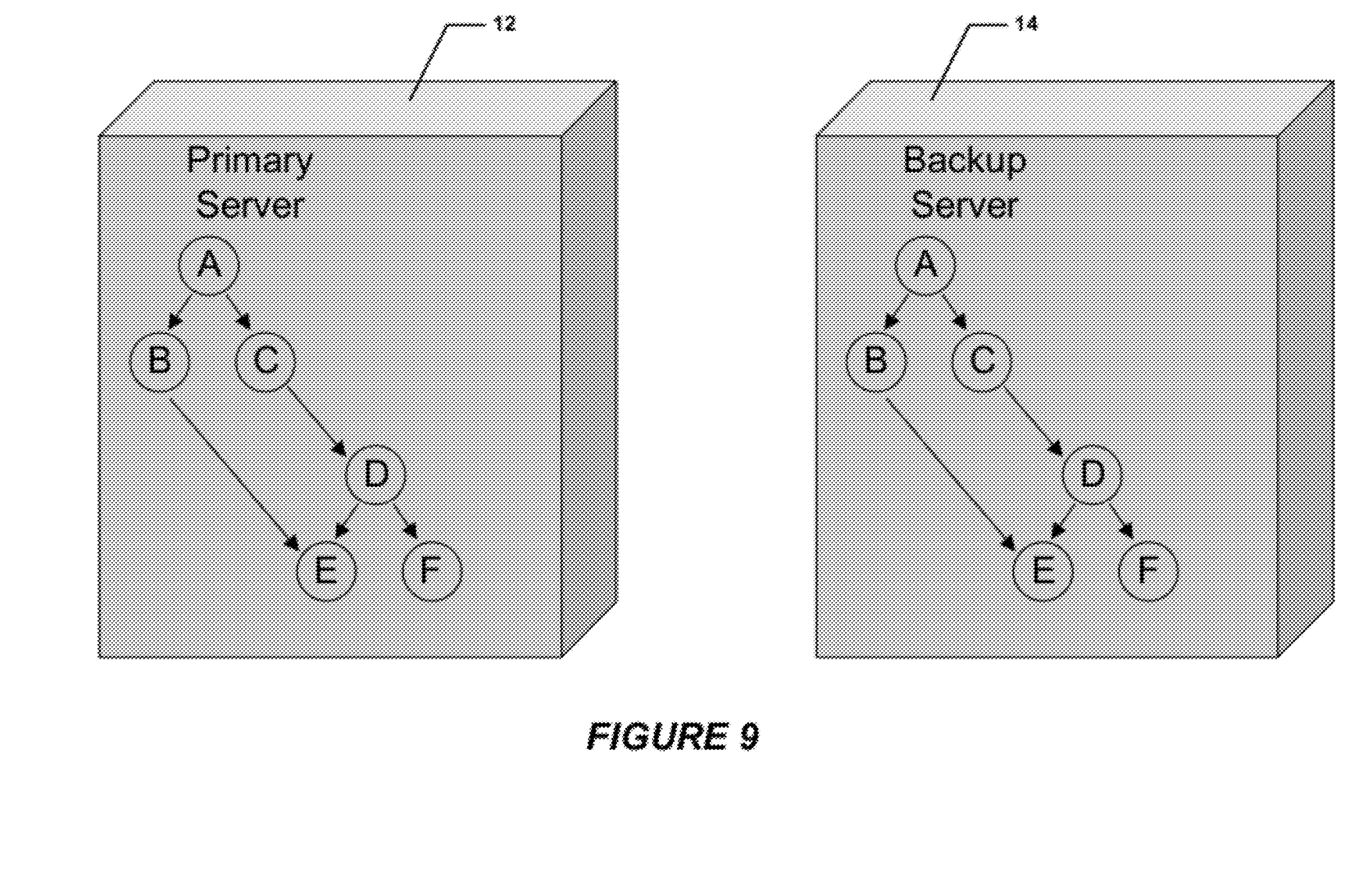
FIG. 9 depicts a block diagram of a backup environment wherein data objects have multiple references.

Referring now to FIG. 9, an environment including multiple references is shown. In this example primary server 12 is synchronized with backup server 14. Each contain data object A which has a strong reference to data object B, data object A has a strong reference to data object C, data object C also has a strong reference to data object D, data object D also has a strong reference to data object E and data object D has a strong reference to data object F. Also data object B has a strong reference to data object E. In the case where objects are only ever referenced by zero or one other object, DELETE notifications could be sent to the backup server 14 as soon as an object is de-referenced. However, it is possible for objects to be referenced by multiple objects, as is the case for E above. In this scenario, if C was removed from A on the primary, DELETE notifications would only be sent for C, D and F, but not for E because it still has one reference remaining (from B).

To manage multiple references, the primary system 12 could manually count the references each object has, as individual references are added and removed. However, this requires synchronization between the many threads that are changing the object structure, which impacts performance. The presently described use of notifications received from the garbage collector eliminates the need to count references and synchronize threads, thereby improving performance.

Figure 10:
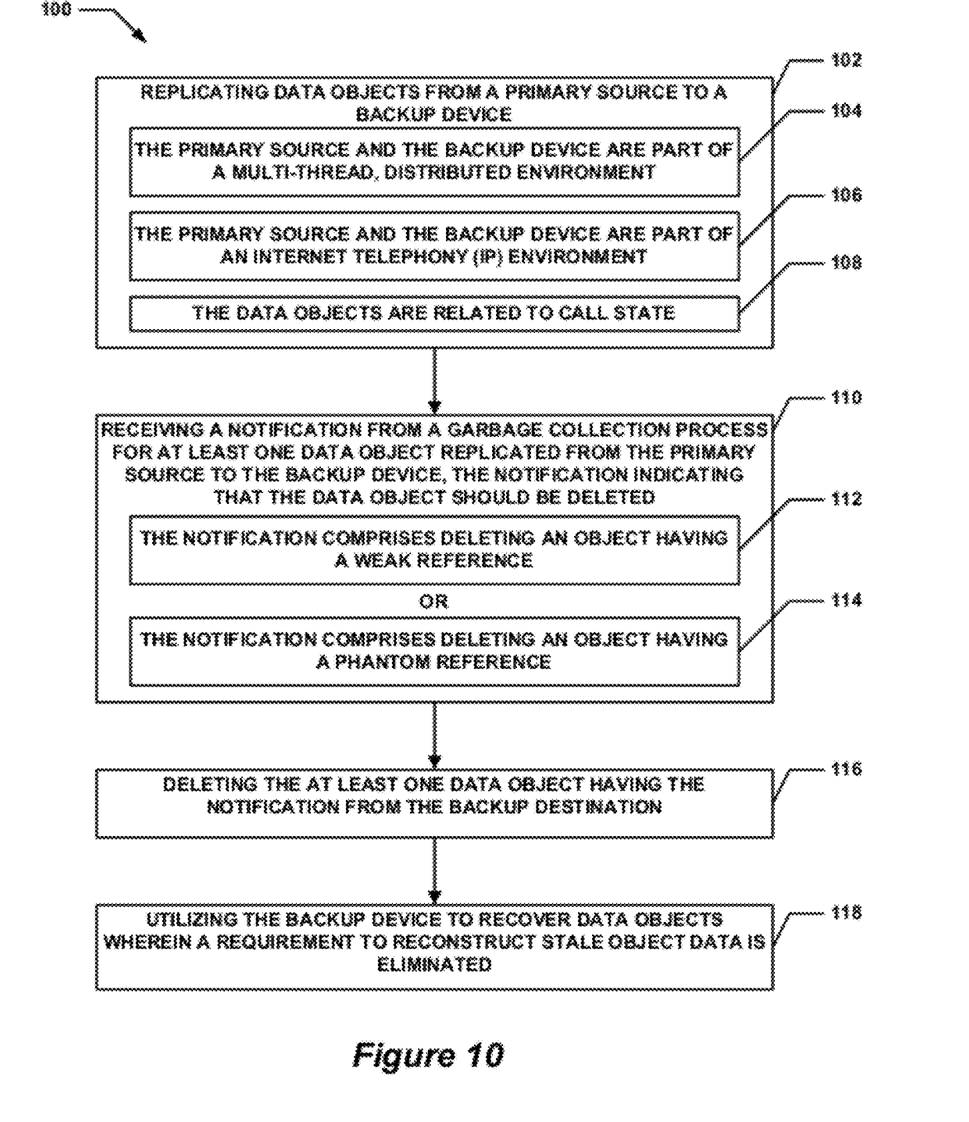
FIG. 10 shows a flow diagram of a particular embodiment of a method for performing removal of replicated objects based on garbage collection in accordance with embodiments of the invention.

A flow chart of one particular embodiment of the presently disclosed method is depicted in FIG. 10. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 10, a particular embodiment of a method 10 for providing removal of replicated objects based on garbage collection is shown. Method 100 starts with processing block 102 which discloses replicating data objects from a primary source to a backup device. As shown in processing block 104, in certain embodiments the primary source and the backup device are part of a multi-thread, distributed environment. As shown in processing block 106, the primary source and the backup device may be part of an Internet Telephony (IP) environment. Processing block 108 states the data objects are related to call state.

Processing continues with processing block 110 which recites receiving a notification from a garbage collection process for at least one data object replicated from the primary source to the backup device, the notification indicating that the data object should be deleted. This used to maintain the backup server data in synchronization with the primary device data. As shown in processing block 112, the notification comprises deleting an object having a weak reference. A weakly reachable object will be garbage collected during the next collection cycle. As shown in processing block 114, the notification comprises deleting an object having a phantom reference. A phantom reference is used to reference objects that have been marked for garbage collection and have been finalized, but have not yet been reclaimed.

Processing block 116 discloses deleting the at least one data object having the notification from the backup destination. Processing block 118 states utilizing the backup device to recover data objects wherein a requirement to reconstruct stale object data is eliminated. The presently described use of notifications received from the garbage collector eliminates the need to count references and synchronize threads, thereby improving performance.

Figure 11:
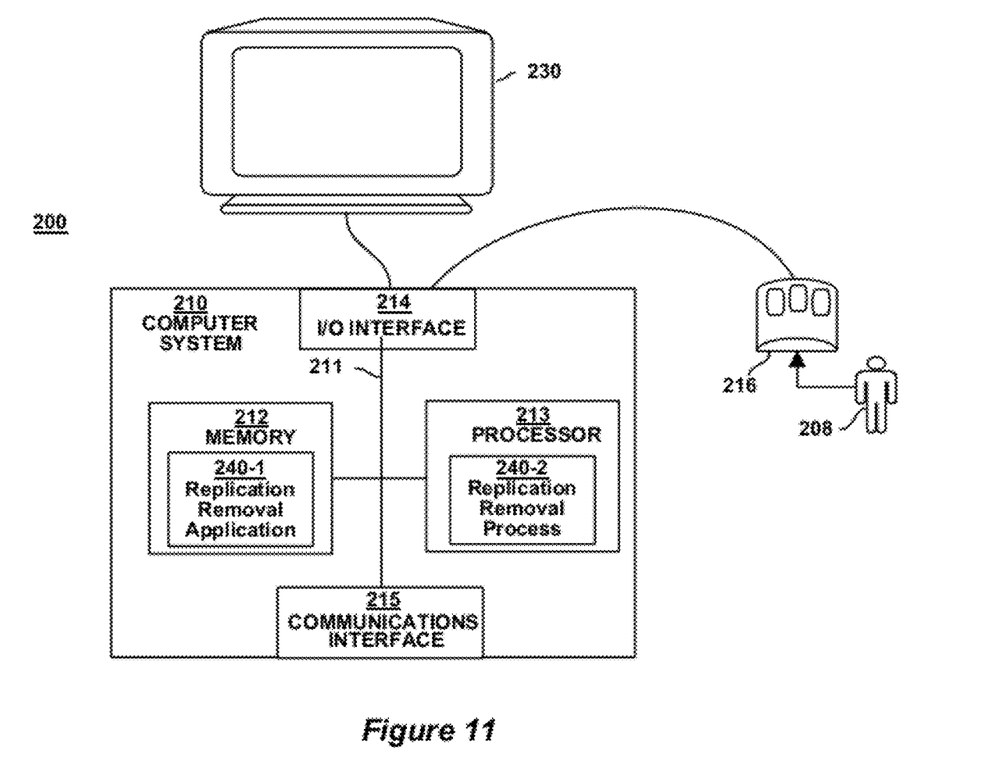
FIG. 11 illustrates an example computer system architecture for a computer system that performs removal of replicated objects based on garbage collection in accordance with embodiments of the invention.

FIG. 11 is a block diagram illustrating example architecture of a computer system 110 that executes, runs, interprets, operates or otherwise performs removal of replicated objects based on garbage collection application 140-1 and removal of replicated objects based on garbage collection operating process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface 160 that removal of replicated objects based on garbage collection operating application 140-1 and process 140-2 provides on the display 130.

As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a removal of replicated objects based on garbage collection operating application 140-1 as explained herein. The removal of replicated objects based on garbage collection operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a removal of replicated objects based on garbage collection operating application 140-1. Execution of a removal of replicated objects based on garbage collection operating application 140-1 in this manner produces processing functionality in the removal of replicated objects based on garbage collection operating process 140-2. In other words, the removal of replicated objects based on garbage collection operating process 140-2 represents one or more portions or runtime instances of a removal of replicated objects based on garbage collection operating application 140-1 (or the entire a billing repository operating application 140-1) performing or executing within or upon the processor 113 in the computerized device 110 at runtime.

It is noted that example configurations disclosed herein include the removal of replicated objects based on garbage collection operating application 140-1 itself (i.e., in the form of un-executed or non-performing logic instructions and/or data). The removal of replicated objects based on garbage collection operating application 140-1 may be stored on a computer readable medium (such as a floppy disk), hard disk, electronic, magnetic, optical, or other computer readable medium. A removal of replicated objects based on garbage collection operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a removal of replicated objects based on garbage collection operating application 140-1 in the processor 113 as the removal of replicated objects based on garbage collection operating process 140-2. Those skilled in the art will understand that the computer system 110 may include other processes and/or software and hardware components, such as an operating system not shown in this example.

A display 130 need not be coupled directly to computer system 110. For example, the removal of replicated objects based on garbage collection operating application 140-1 can be executed on a remotely accessible computerized device via the network interface 115. In this instance, the graphical customer interface 160 may be displayed locally to a customer 108 of the remote computer, and execution of the processing herein may be client-server based.

During operation, processor 113 of computer system 100 accesses memory system 112 via the interconnect 111 in order to launch, run, execute, interpret or otherwise perform the logic instructions of the removal of replicated objects based on garbage collection application 140-1. Execution of removal of replicated objects based on garbage collection application 140-1 produces processing functionality in removal of replicated objects based on garbage collection process 140-2. In other words, the removal of replicated objects based on garbage collection process 140-2 represents one or more portions of the removal of replicated objects based on garbage collection application 140-1 (or the entire application) performing within or upon the processor 113 in the computer system 100.

It should be noted that, in addition to the removal of replicated objects based on garbage collection process 140-2, embodiments herein include the removal of replicated objects based on garbage collection application 140-1 itself (i.e., the un-executed or non-performing logic instructions and/or data). The removal of replicated objects based on garbage collection application 140-1 can be stored on a computer readable medium such as a floppy disk, hard disk, or optical medium. The removal of replicated objects based on garbage collection application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of removal of replicated objects based on garbage collection application 140-1 in processor 113 as the removal of replicated objects based on garbage collection process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   replicating data objects from a primary source to a backup device;
   receiving a notification from a garbage collection process for at least one data object replicated from said primary source to said backup device, said notification indicating that said data object should be deleted; and deleting from said backup destination said data object having said notification for which said primary source has received a finalized garbage collection notification.

2. The method of claim 1 wherein said notification comprises deleting an object having a weak reference.

3. The method of claim 1 wherein said notification comprises deleting an object having a phantom reference.

4. The method of claim 1 wherein said notification comprises deleting an object having a soft reference.

5. The method of claim 1 wherein said primary source and said backup device are part of a multi-thread, distributed environment.

6. The method of claim 1 wherein said primary source and said backup device are part of an Internet Telephony (IP) environment.

7. The method of claim 1 wherein said data objects are related to call state.

8. The method of claim 1 further comprising utilizing said backup device to recover data objects wherein a requirement to reconstruct stale object data is eliminated.

9. A computer readable storage medium having computer readable code thereon for providing removal of replicated objects based on garbage collection, the medium including instructions in which a computer system performs operations comprising:

replicating data objects from a primary source to a backup device;

receiving a notification from a garbage collection process for at least one data object replicated from said primary source to said backup device, said notification indicating that said data object should be deleted; and deleting from said backup destination said data object having said notification for which said primary source has received a finalized garbage collection notification.

10. The computer readable storage medium of claim 9 further comprising instructions wherein said notification comprises deleting an object having a weak reference.

11. The computer readable storage medium of claim 9 further comprising instructions wherein said notification comprises deleting an object having a phantom reference.

12. The computer readable storage medium of claim 9 further comprising instructions wherein said notification comprises deleting an object having a soft reference.

13. The computer readable storage medium of claim 9 further comprising instructions wherein said primary source and said backup device are part of a multi-thread, distributed environment.

14. The computer readable storage medium of claim 9 further comprising instructions wherein said primary source and said backup device are part of an Internet Telephony (IP) environment.

15. The computer readable storage medium of claim 9 further comprising instructions wherein said data objects are related to call state.

16. The computer readable storage medium of claim 9 further comprising instructions for utilizing said backup device to recover data objects wherein a requirement to reconstruct stale object data is eliminated.

17. A computer system comprising:

a memory;

a processor;

a communications interface;

an interconnection mechanism coupling the memory, the processor and the communications interface; and wherein the memory is encoded with an application providing removal of replicated objects based on garbage collection, that when performed on the processor, provides a process for processing information, the process causing the computer system to perform the operations of:

replicating data objects from a primary source to a backup device;

receiving a notification from a garbage collection process for at least one data object replicated from said primary source to said backup device, said notification indicating that said data object should be deleted; and deleting said at least one data object having said notification from said backup destination, for which said primary source has received a finalized garbage collection notification.

18. The computer system of claim 17 wherein said notification comprises deleting an object having a weak reference.

19. The computer system of claim 17 wherein said notification comprises deleting an object having a phantom reference.

20. The computer system of claim 17 wherein said notification comprises deleting an object having a soft reference.

21. The computer system of claim 17 wherein said data objects are related to call state.

* * * * *